US006948853B2

(12) United States Patent
Agrawal

(10) Patent No.: US 6,948,853 B2
(45) Date of Patent: Sep. 27, 2005

(54) HIGH LOAD CAPACITY STACKED FOIL THRUST BEARING ASSEMBLY

(75) Inventor: Giridhari L. Agrawal, Simsbury, CT (US)

(73) Assignee: R & D Dynamics Corporation, Bloomfield, CT (US)

( * ) Notice: Subject to any disclaimer, the term of this patent is extended or adjusted under 35 U.S.C. 154(b) by 133 days.

(21) Appl. No.: 10/608,975

(22) Filed: Jun. 27, 2003

(65) Prior Publication Data

US 2005/0147335 A1 Jul. 7, 2005

Related U.S. Application Data

(60) Provisional application No. 60/415,907, filed on Oct. 3, 2002.

(51) Int. Cl.[7] .............................................. F16C 32/06
(52) U.S. Cl. .............................................. 384/105
(58) Field of Search ................................ 384/103–106

(56) References Cited

U.S. PATENT DOCUMENTS

| | | | | |
|---|---|---|---|---|
| 3,382,014 A | | 5/1968 | Marley | |
| 4,462,700 A | | 7/1984 | Agrawal | |
| 5,275,493 A | * | 1/1994 | Ide | 384/103 |
| 5,547,286 A | * | 8/1996 | Struziak | 384/105 |
| 5,961,217 A | * | 10/1999 | Heshmat | 384/105 |
| 6,158,892 A | * | 12/2000 | Stewart et al. | 384/105 |

OTHER PUBLICATIONS

Agrawal, Giri L., "Foil Air/Gas Bearing Technology—An Overview", Int'l. Gas Turbine & Aeroengine Congress & Exhibition, Jun. 1997, pp. 1-11, ASME, New York, NY, US.

* cited by examiner

*Primary Examiner*—Thomas R. Hannon
(74) *Attorney, Agent, or Firm*—McCormick, Paulding & Huber LLP

(57) ABSTRACT

A stacked foil thrust bearing assembly provides a compact, lightweight, high load capacity, high temperature, oil-free foil thrust bearing for use in high speed rotating machinery. A stacked foil thrust bearing assembly comprises a plurality of thrust runners in adjacently spaced and parallel relationship. Each thrust runner includes an annular-shaped portion having generally opposite axial sides, and a thrust bearing positioned on each of the generally opposite axial sides. Each thrust bearing includes a thrust bearing plate and a spring plate operatively engaging the thrust bearing plate. A plurality of foils are circumaxially dispersed about one axial side of the thrust bearing plates. A plurality of springs are circumaxially dispersed about one axial side of the spring bearing plates.

20 Claims, 4 Drawing Sheets

HIGH LOAD CAPACITY STACKED FOIL THRUST BEARING ASSEMBLY

CROSS-REFERENCE TO RELATED APPLICATION

This application claims the benefit of U.S. Provisional Application 60/415,907, filed Oct. 3, 2002, which is incorporated herein by reference.

FIELD OF INVENTION

The present invention is generally related to thrust bearing technology, and is more specifically directed to a stacked foil thrust bearing assembly for use in high speed rotating machinery.

BACKGROUND OF THE INVENTION

There is a great need for gas turbine engines and auxiliary power units providing improved performance, lower cost, better maintainability, and higher reliability. The Integrated High Performance Turbine Engine Technology program has provided significant advances in compressors, turbines, combustors, materials, generators, and other technologies. In order to make significant improvement in power vs. weight ratio, gas turbine engines and auxiliary power units must operate at higher speed and at higher temperature. In addition, the complicated oil lubrication system must be eliminated to facilitate higher temperature operation, and to reduce weight and cost. Magnetic bearings have shown great promise to meet goals of the Integrated High Performance Turbine Engine Technology program. However, in many applications, use of magnetic bearings is limited due to requirements of auxiliary bearings, cooling methods, weight and cost.

Foil air bearings do provide a promising alternative to magnetic bearings. Foil air bearings are successfully being used in air cycle machines of aircraft environmental control systems. Today, every new aircraft environmental control system, either military or civilian, invariably makes use of foil air bearings. Older aircraft are being converted from ball bearings to foil air bearings. Certain military aircraft air cycle machines used ball bearings up to 1982 and since then, are using foil air bearings. The reliability of foil air bearings in air cycle machines of commercial aircraft has been shown to be ten times that of previously used ball bearings in air cycle machines.

In spite of tremendous success of foil air bearings for air cycle machines, their use for gas turbine engines has been limited. This is due to the fact that gas turbine engines operate at higher temperatures and exhibit higher radial and axial loads. The radial loads are carried by foil journal bearings such as shown in U.S. Pat. No. 3,382,014 and discussed in ASME paper 97-GT-347 (June 1997) by Giri L. Agrawal entitled "Foil Air/Gas Bearing Technology—An Overview." The axial loads are carried by foil thrust bearings such as shown in U.S. Pat. Nos. 3,382,014 and 4,462,700. In recent years, the load capacity of foil journal bearings has increased to a level which is satisfactory to carry radial loads of a typical gas turbine engine. However, the thrust load capacity requirement of a foil thrust bearing to be used for a gas turbine engine could be as much as four times that supplied by present day thrust bearing technology.

One solution to achieve higher thrust load capacity for a foil thrust bearing in a gas turbine engine is to increase the diameter of the thrust bearing. But larger diameters require greater radial space, increase stresses in the thrust runners, and increase power loss. Load capacity of a foil thrust bearing is also dependent on the flatness of the bearing. As flatness is maximized, load capacity increases. Due to various manufacturing tolerances and constraints, and also due to various operating conditions, keeping the thrust bearing very flat is a difficult task. The problem becomes more difficult as the size, and especially the diameter, of the thrust bearing increases.

The use of foil bearings in turbomachinery has several advantages:

Higher Reliability—Foil bearing machines are more reliable because there are fewer parts necessary to support the rotative assembly and there is no lubrication needed to feed the system. When the machine is in operation, the air/gas film between the bearing and the shaft protects the bearing foils from wear. The bearing surface is in contact with the shaft only when the machine starts and stops. During this time, a polymer coating, such as Teflon®, on the foils limits the wear.

Oil Free Operation—There is no contamination of the bearings from oil. The working fluid in the bearing is the system process gas which could be air or any other gas.

No Scheduled Maintenance—Since there is no oil lubrication system in machines that use foil bearings, there is never a need to check and replace the lubricant. This results in lower operating costs.

Environmental and System Durability—Foil bearings can handle severe environmental conditions such as shock and vibration loading. Any liquid from the system can easily be handled.

High Speed Operation—Compressor and turbine rotors have better aerodynamic efficiency at higher speeds, for example, 60,000 rpm or more. Foil bearings allow these machines to operate at the higher speeds without any of the limitations encountered with ball bearings. In fact, due to the aerodynamic action, they have a higher load capacity as the speed increases.

Low and High Temperature Capabilities—Many oil lubricants cannot operate at very high temperatures without breaking down. At low temperature, oil lubricants can become too viscous to operate effectively. As mentioned above, foil bearings permit oil free operation. Moreover, foil bearings operate efficiently at severely high temperatures, as well as at cryogenic temperatures.

SUMMARY OF THE INVENTION

The present invention is directed in one aspect to a stacked foil thrust bearing assembly for use in high speed rotating machines comprising a plurality of thrust runners in adjacently spaced and parallel relationship. Each thrust runner includes an annular-shaped portion having generally opposite axial sides, and a thrust bearing positioned on each of the generally opposite axial sides. Each thrust bearing includes a thrust bearing plate and a spring plate operatively engaging the thrust bearing plate.

The present invention is directed in a second aspect to a stacked foil thrust bearing assembly for use in high speed rotating machines comprising a plurality of thrust runners in adjacently spaced and parallel relationship and having annular thrust-carrying surfaces. The thrust-carrying surfaces of the thrust runners face the same axial direction. A thrust bearing plate is positioned adjacent the annular thrust-carrying surface of each thrust runner. Each thrust bearing plate has two opposite axial sides and including on one axial side a plurality of foils in confronting relationship with the thrust-carrying surface of the thrust runner. A spring plate is positioned adjacent the axial side of each thrust bearing plate opposite the one axial side having the foils. A plurality of springs is included on each spring plate.

The present invention also resides in independent thrust bearing assemblies with individual thrust runners having interlocking fit. The interlocking capability of the bearing assemblies permits adding or subtracting the number of bearings assemblies, including thrust runners and at least two thrust bearings per thrust runner to distribute the load and thrust of the machinery as necessary and as desired.

The benefits of the stacked foil thrust bearing assembly of the present invention include the following:

a) Load capacity is increased without increasing the radial space required for one larger thrust bearing, thus a smaller diameter for the thrust bearings may be maintained.
b) Maximum stress in a stacked foil thrust bearing assembly thrust runner is considerably less than the runner of a larger thrust bearing.
c) The rotating shaft speed of the machine may be increased due to the reduced thrust runner size associated with thrust bearings of smaller diameter.
d) Power loss in multiple thrust bearings combined is less than one larger thrust bearing, because power loss varies as a function of $D^4$, where D is the nominal diameter of the bearing.
e) Multiple thrust bearings will have higher probability of remaining flat and parallel to the thrust runner than one larger diameter bearing, thereby extending the life of the bearings.

DETAILED DESCRIPTION OF THE INVENTION AND PREFERRED EMBODIMENTS THEREOF

Figure 1:
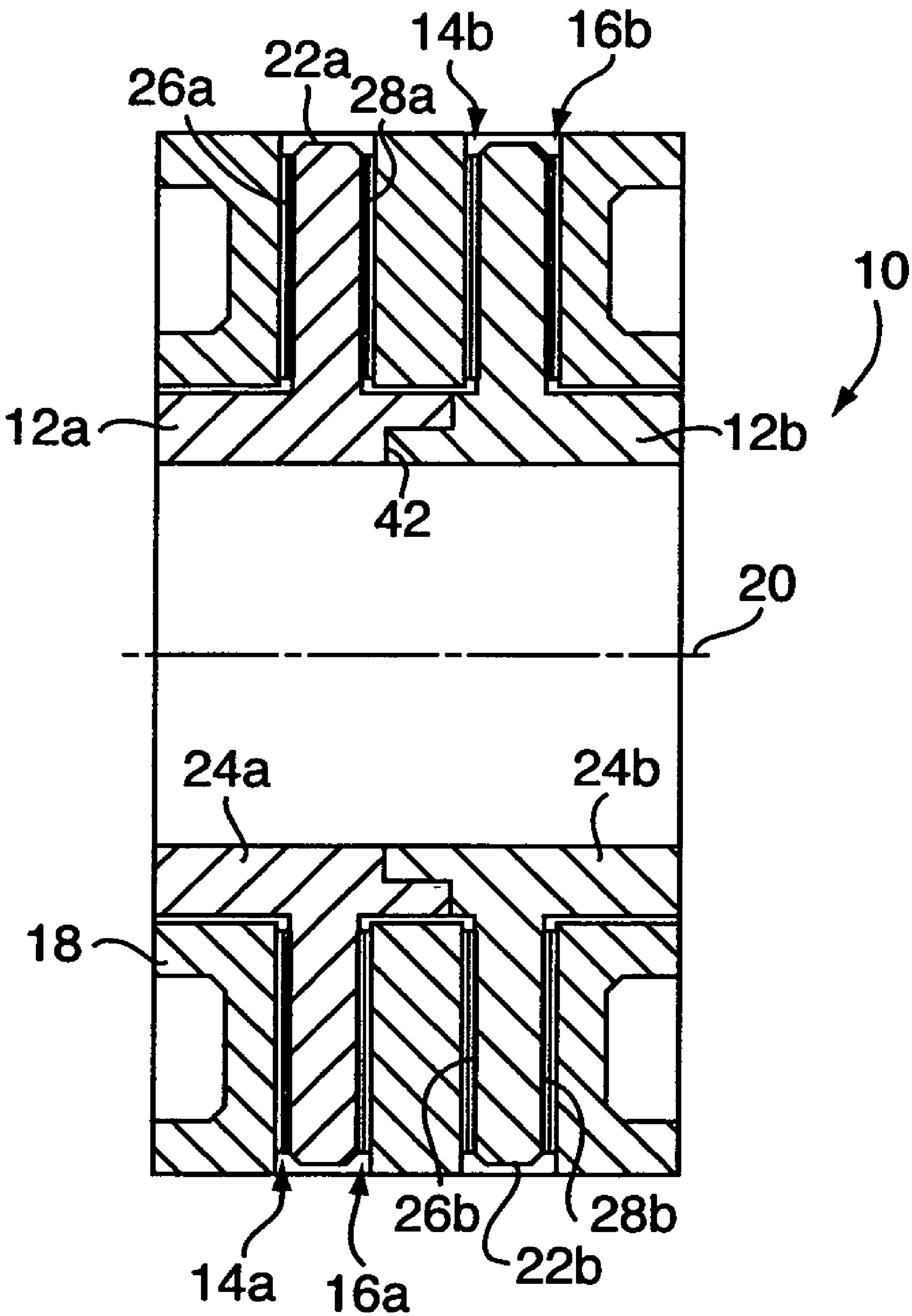
FIG. 1 is a cross-sectional view of a stacked foil thrust bearing assembly in accordance with the present invention, and shows two thrust bearing runners with associated thrust bearings stacked within a bearing housing.

FIG. 1 shows a cross-sectional view of a stacked foil thrust bearing assembly of the present invention, generally designated by reference numeral 10, and comprising a plurality of thrust runners 12*a* and 12*b*, and thrust bearings associated with each thrust runner 12*a* and 12*b*. As more specifically shown in FIGS. 4 and 5, thrust bearings 14*a* and 16*a* are associated with thrust runner 12*a* and thrust bearings 14*b* and 16*b* are associated with thrust runner 12*b*.

The bearing assembly 10 is positioned within a bearing housing 18 and may form part of a rotating shaft coupled to a turbine or a rotor, the shaft extending through the housing 18 along a central axis of rotation 20. The shaft can be coupled to the turbine or rotor by interference fit, tie rod, or other known means. The thrust runners 12*a* and 12*b* are disposed within the housing 18 in spaced and parallel relationship to one another. The discussion below focuses on the thrust runner 12*a*, though the thrust runner 12*b* has generally the same design and elements. Like reference numerals succeeded by the letters a and b are used to indicate like elements.

Preferably, the thrust runner 12*a* has an annular-shaped portion 22*a* extending radially from and circumscribing a hub 24*a*. The hub 24*a* preferably forms a section of the shaft so that the thrust runner 12 is capable of rotation around the central axis 20 in coordination with the rotation of the shaft. Alternatively, the hub 24*a* may be operatively coupled to the shaft. For example, the hub 24*a* may slide over the shaft so that the associated thrust runner 12*a* is co-axially aligned with the shaft. The thrust runner 12*a* may also be a separate piece coupled to a hub 24*a* or the shaft.

Typically, each thrust runner 12*a* has first and second opposed axial sides, 26*a* and 28*a* respectively, which act as thrust-carrying surfaces. As shown, the first and second sides 26*a* and 28*a* are annular thrust-carrying surfaces circumscribing the hub 24*a*. In a preferred embodiment of the present invention, at least one of the thrust bearings 14*a* or 16*a* is provided on a respective axial side 26*a* and 28*a* of the thrust runner 12*a*. However, for unidirectional thrust, only one thrust bearing (e.g., 14*a*) is needed at one axial side of the thrust runner 12*a*. The positioning of the thrust bearing 14*a* with respect to the thrust-carrying surface of the thrust runner 12*a*—i.e., adjacent one of the axial sides 26*a* or 28*a*–is determined based on the direction of thrust and how the distribution of the axial loads will be best maximized. Where multiple thrust runners are stacked in adjacently spaced and parallel relationship, the thrust-carrying surface of each thrust runner will be facing the same axial direction.

Figure 2:
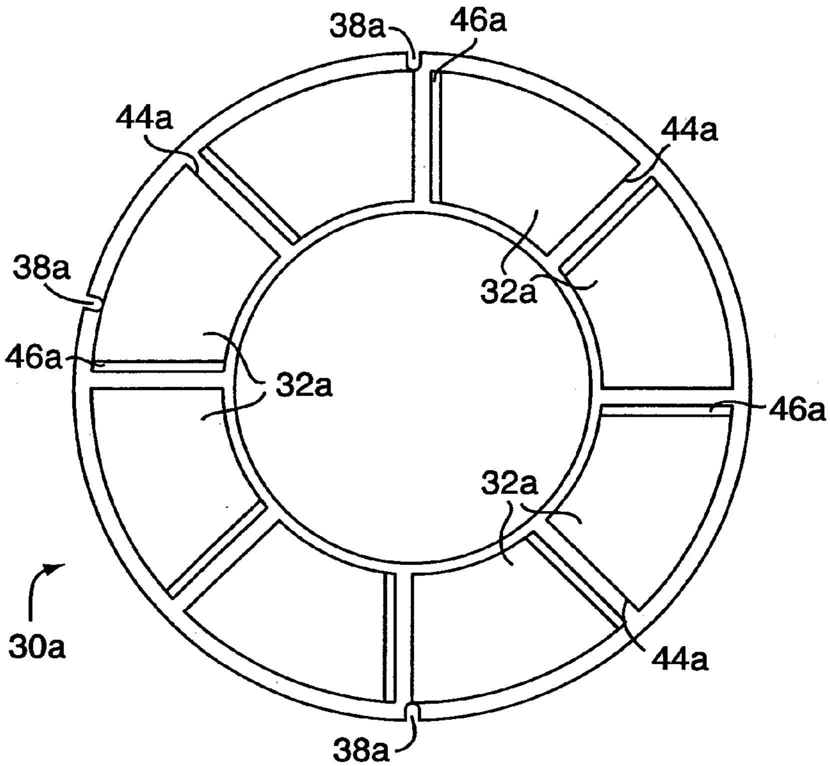
FIG. 2 is a side view of a typical thrust bearing plate showing a plurality of circumaxially-distributed top foils.
Figure 3:
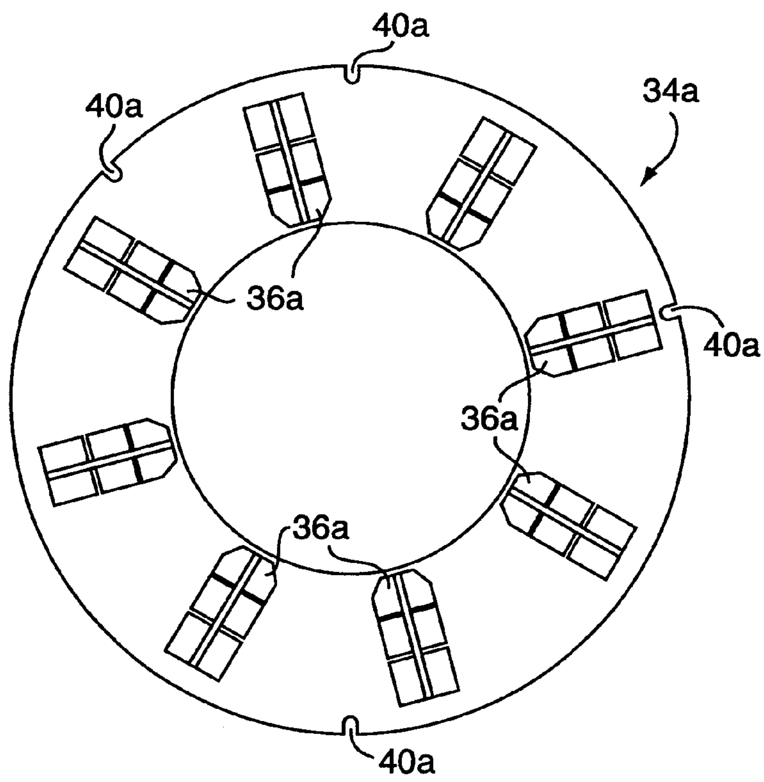
FIG. 3 is a side view of a typical spring plate showing a plurality of circumaxially-distributed leaf springs.
Figure 4:
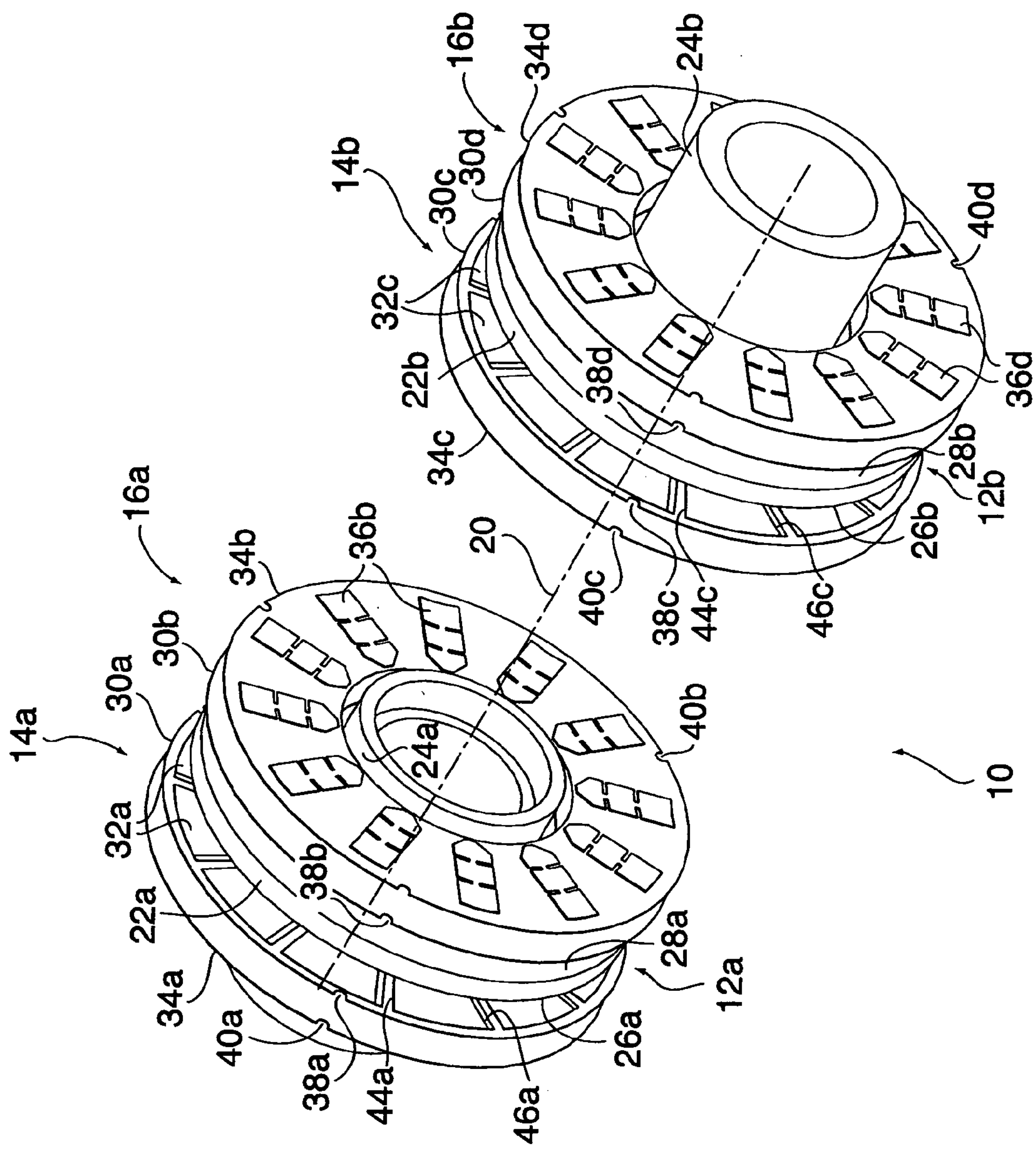
FIG. 4 is a perspective view of the thrust bearing assembly shown in FIG. 1.
Figure 5:
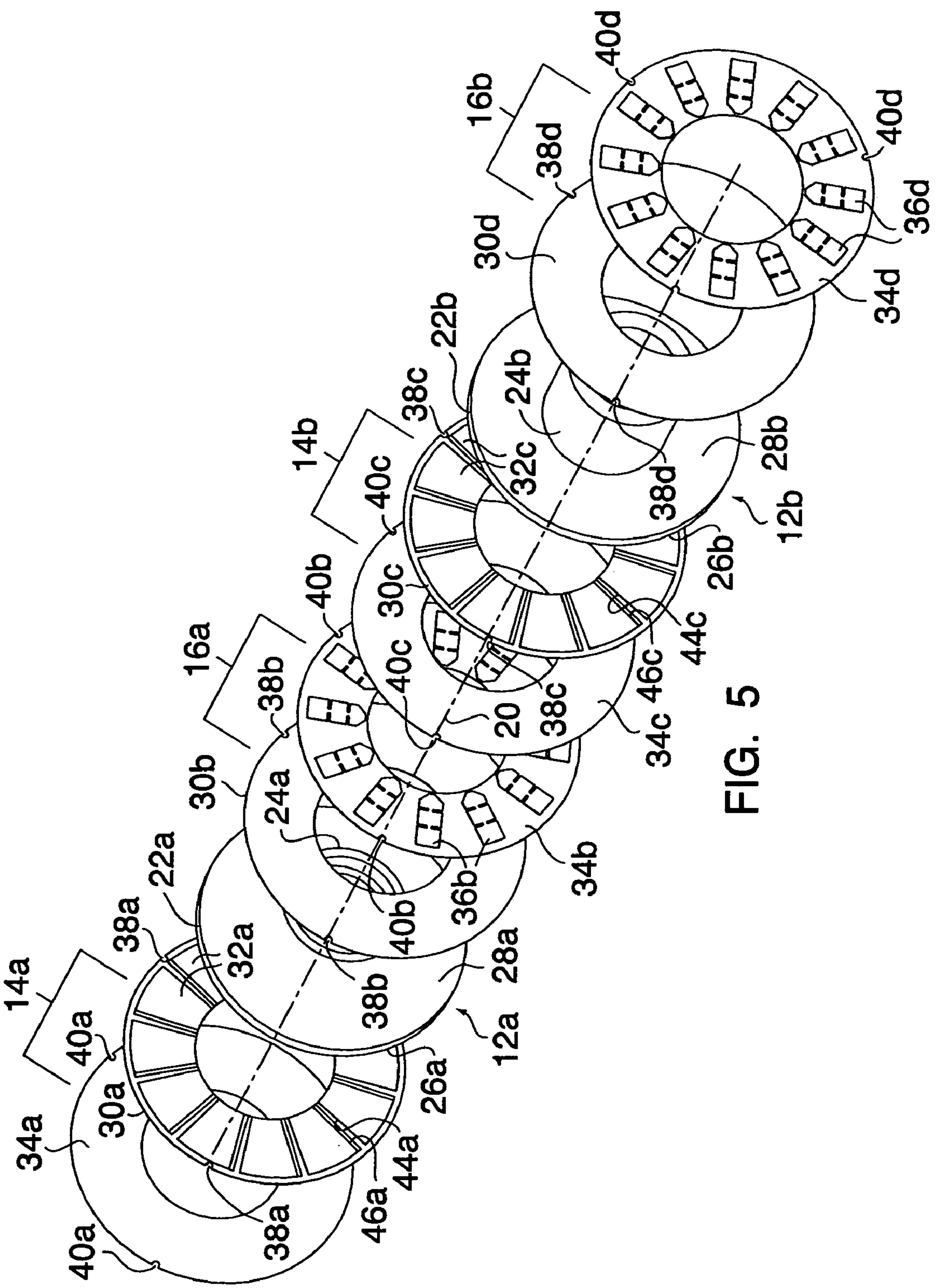
FIG. 5 is an exploded perspective view of the thrust bearing assembly in FIG. 4.

The thrust bearings 14*a* and 16*a*, and 14*b* and 16*b* of the present invention are shown more particularly in FIGS. 4 and 5. The thrust bearing 14*a* is illustrated in FIGS. 2 and 3, and the description of the thrust bearing 14*a* below generally relates to a single set of reference numerals. The thrust bearings 14*a* and 16*a*, and 14*b* and 16*b* are similar in many respects, with the exception of the directional thrust designations of each thrust bearing, as discussed in more detail below. Like reference numerals succeeded by the letters a, b, c and d are used to indicate like elements.

As shown in FIGS. 2–5, each thrust bearing includes a thrust bearing plate 30*a* (FIG. 2) with multiple top foils 32*a*, and a spring plate 34*a* (FIG. 3) with multiple leaf springs or flat springs 36*a*. The thrust bearing 14*a* is preferably kept stationary within the housing 18 relative to the thrust runner 12*a* to aid in distribution of the axial loads. As shown in FIGS. 2–3, the thrust bearing plate 30*a* and the spring plate 34*a* are provided with respective pluralities of peripheral notches 38*a* and 40*a*. The notches 38*a*, 40*a* engage anti-rotation pins (not shown) in the housing 18 to hold the thrust bearing plate 30*a* and the spring plate 34*a* essentially stationary within the housing 18 while the shaft and the thrust runner 12*a* are rotating. Additionally, the housing 18 axially supports the spring plate 34*a*, which, in turn, axially supports the adjacent thrust bearing plate 30*a*.

Preferably, the thrust bearing 14*a* is centered on and is generally symmetric about the central axis 20. Each thrust runner 12*a* and its respective axially disposed thrust bearings 14*a* and 16*a* support and transmit the axial load of the rotating machinery through the assembly in a distributed fashion. Where thrust bearings are provided on both axial sides of the thrust runner 12*a*, both sides act as thrust-carrying surfaces. The thrust bearing on one axial side of a thrust runner (e.g., thrust bearing 14*a*), designated a clockwise thrust bearing, supports and distributes axial load in one direction, while the thrust bearing on the opposed axial side (e.g., thrust bearing 16*a*), designated a counter-clockwise thrust bearing, supports and distributes axial load in the other direction. The clockwise or counter-clockwise designations are defined when viewing the thrust bearing along the central axis 20 facing the thrust runner 12*a*.

In order to meet high load capacity requirement of a rotating machine, such as a gas turbine engine, two or more thrust runners, each with corresponding thrust bearings flanking both axial sides thereof, are used to share the loads. The hub 24*a* for the thrust runner 12*a* may be provided with at least one interlocking or mating surface 42 to facilitate the stacking and alignment of the thrust runner 12*a* with additional thrust runners, such as thrust runner 12*b* in FIG. 1. The thrust-carrying surfaces of such stacked thrust runners 12*a* and 12*b* are essentially parallel to one another. Consequently, the thrust bearing plates and the spring plates of the respective thrust bearings 14*a* and 16*a*, and 14*b* and 16*b* are aligned essentially parallel to the thrust-carrying surfaces. The stacked bearing assemblies share the load-carrying task from axial thrust loads generated by a turbine rotor along the central axis 20.

The top foils 32*a* on the thrust bearing plate 30*a* are typically made from flexible steel foil, such as Inconel®, and have a thickness between about 0.003 inches to about 0.015 inches. The top foils 32*a* are commonly secured to the axial side of the thrust bearing plate 30*a* facing the thrust runner 12*a*, and are preferably welded along a leading edge 46*a* of the foils 32*a* to the thrust bearing plate 30*a* at circumaxial positions thereabout, while a trailing edge 44*a* of the foils 32*a* is free to flex. The leading edge 46*a* of each top foil 32*a* is defined with respect to the direction of rotation of the shaft relative to the top foils 32*a*. The top foils 32*a* are thus compliant with the thrust runner 12*a* during high-speed shaft rotation and, in conventional fashion, form a hydrodynamic lift to support the axial load. A polymer coating, such as Teflon®, is provided on the exposed outer face of the top foils 32*a* to protect them during start-up until air or gas film at the interface between the foils 32*a* and the thrust runner 12*a* takes over. Preferably, the top foils 32*a* are sector-shaped so as to maximize their compliance while the respective thrust runner 12*a* is rotating about the central axis 20.

Preferably, each spring plate operatively engages an adjacent thrust bearing plate within the housing 18. While the thrust bearing plate 30*a* and the spring plate 34*a* could be combined into one plate with the top foils 32*a* on one side and the springs 36*a* on the other side, the practice of using separate plates, as shown, is preferred. The top foils 32*a* are located on the axial side of the thrust bearing plate 30*a* opposite from the spring plate 34*a*. Preferably, the leaf springs 36*a* are disposed on the axial side of the spring plate 34*a* facing the housing 18, opposite from the thrust bearing plate 30*a*. The leaf springs 36*a* are usually welded to the spring plate 34*a*. While a specific design for the leaf springs 36*a* is shown, various leaf spring or flat spring designs may be used on the spring plate 34*a*, without departing from the broader aspects of the present invention. The preferred axial positioning and arrangement of the thrust bearing plate 30*a*, the top foils 32*a*, the spring plate 34*a* and the leaf springs 36*a* of the thrust bearing 14*a* with respect to the thrust runner 12*a*, as well as the similar components for thrust bearing 16*a*, and also thrust bearings 14*b* and 16*b* with respect to thrust runner 12*b*, can be more clearly seen in FIGS. 4–5.

Assuming that the thrust runners 12*a* and 12*b* and the respective thrust bearings 14*a*, 16*a* and 14*b*, 16*b* therefor are positioned along the central axis 20 within prescribed tolerances relative to the housing 18, the compliance of the top foils and springs used therewith ensures that the thrust loads of the turbine or rotor are distributed evenly between the plurality of stacked thrust bearings 14*a*, 16*a* and 14*b*, 16*b*. Consequently, the load-carrying capacity of the thrust bearing assembly of the present invention is increased by multiples over the current state of the technology using a single thrust runner and foil bearings.

The foregoing description of embodiments of the present invention has been presented for the purpose of illustration and description, and is not intended to be exhaustive or to limit the present invention to the form disclosed. For example, although the illustrated embodiments show only two stacked thrust runners and associated foil thrust bearings in an assembly, it should be clear that three or more thrust runners with associated foil thrust bearings can be stacked in an assembly for increased thrust load capacity. As will be recognized by those skilled in the pertinent art to which the present invention pertains, numerous changes and modifications may be made to the above-described embodiments without departing from the broader aspects of the present invention.

What is claimed is:

1. A stacked foil thrust bearing assembly for use in high speed rotating machines comprising:

a plurality of thrust runners in adjacently spaced and parallel relationship, each thrust runner including an annular-shaped portion having generally opposite axial sides;

a thrust bearing positioned on each axial side of the thrust runners, each thrust bearing including a thrust bearing plate and a spring plate operatively engaging the thrust bearing plate.

2. The stacked foil thrust bearing assembly of claim 1, each thrust bearing plate being annular-shaped and having two opposite axial sides, and further including a plurality of foils circumaxially dispersed about one axial side of the thrust bearing plate.

3. The stacked foil thrust bearing assembly of claim 2, wherein each foil has a leading edge that is secured to the thrust bearing plate and a trailing edge that is not secured.

4. The stacked foil thrust bearing assembly of claim 3, said foils being compliant.

5. The stacked foil thrust bearing assembly of claim 3, wherein each thrust bearing plate is adjacent the axial sides of the thrust runner so that the one axial side of each thrust bearing plate is in confronting relationship with the thrust runner.

6. The stacked foil thrust bearing assembly of claim 1, each spring plate being annular-shaped and having two opposite axial sides, and further including a plurality of springs circumaxially dispersed about one axial side of the spring plate.

7. The stacked foil thrust bearing assembly of claim 6, wherein the springs are leaf springs.

8. The stacked foil thrust bearing assembly of claim 7, wherein the one axial side about which the leaf springs are dispersed is opposite from the thrust bearing plate.

9. The stacked foil thrust bearing assembly of claim 1, each thrust runner having an individual hub, the hubs of adjacent thrust runners being operatively coupled together.

10. A stacked foil thrust bearing assembly for use in high speed rotating machines, comprising:

a plurality of thrust runners in adjacently spaced and parallel relationship and having annular thrust-carrying surfaces, the thrust-carrying surfaces of each runner facing in the same axial direction;

a thrust bearing plate adjacent the annular thrust-carrying surface of each thrust runner, each thrust bearing plate having two opposite axial sides and including on one axial side a plurality of foils in confronting relationship with the thrust-carrying surface of the thrust runner; and a spring plate adjacent the axial side of each thrust bearing plate opposite said one side, said spring plate including a plurality of springs.

11. The stacked foil thrust bearing assembly of claim 10, wherein each thrust runner of the plurality has two annular thrust-carrying surfaces facing in opposite axial directions, wherein one thrust bearing plate is disposed with foils adjacent to each annular thrust-carrying surface of each thrust runner, and one spring plate operatively engages each thrust bearing plate.

12. The stacked foil thrust bearing assembly of claim 10, wherein the foils are circumaxially dispersed about each thrust bearing plate.

13. The stacked foil thrust bearing assembly of claim 12, wherein each foil has a leading edge that is secured to the thrust bearing plate and a trailing edge that is not secured.

14. The stacked foil thrust bearing assembly of claim 13, said foils being compliant.

15. The stacked foil thrust bearing assembly of claim 10, wherein the springs on each spring plate are circumaxially dispersed thereabout.

16. The stacked foil thrust bearing assembly of claim 15, wherein the springs are leaf springs.

17. The stacked foil thrust bearing assembly of claim 16, each spring plate having two opposite sides including one side opposite from the adjacent thrust bearing plate, wherein the leaf springs are dispersed about said one side.

18. The stacked foil thrust bearing assembly of claim 10, each thrust runner having an individual hub, the hubs of adjacent thrust runners being operatively coupled together.

19. A stacked foil thrust bearing assembly for use in high speed rotating machines, comprising:

a plurality of thrust runners in spaced and parallel relationship for rotation about an axis of rotation of the bearing assembly, each thrust runner having at least one thrust-carrying surface, the thrust-carrying surfaces of each runner facing in the same axial direction; and a plurality of foil thrust bearings cooperating respectively with the thrust-carrying surfaces of the plurality of thrust runners for transmitting thrust loads through the assembly in a distributed fashion.

20. The stacked foil thrust bearing assembly of claim 19, wherein the plurality of thrust runners are disposed in spaced and parallel relationship along a rotatable shaft in the assembly, the thrust-carrying surfaces are annular surfaces circumscribing the rotatable shaft; and the plurality of foil thrust bearings include thrust plates circumscribing the rotatable shaft adjacent the respective annular thrust-carrying surfaces of the thrust runners.

* * * * *